US012686243B1

(12) United States Patent
Kim

(10) Patent No.: US 12,686,243 B1
(45) Date of Patent: Jul. 21, 2026

(54) STABILIZER BAR ASSEMBLY FOR VEHICLE

(71) Applicants: Hyundai Motor Company, Seoul (KR); Kia Corporation, Seoul (KR)

(72) Inventor: Eun Sik Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/306,256

(22) Filed: Aug. 21, 2025

(30) Foreign Application Priority Data

May 12, 2025 (KR) ........................ 10-2025-0061430

(51) Int. Cl.
B60G 21/055 (2006.01)

(52) U.S. Cl.
CPC ..... B60G 21/0551 (2013.01); B60G 21/0558 (2013.01)

(58) Field of Classification Search
CPC .............. B60G 21/055; B60G 21/0551; B60G 21/0553; B60G 21/0556; B60G 21/0558
See application file for complete search history.

(56) References Cited

U.S. PATENT DOCUMENTS

| | | | | | |
|---|---|---|---|---|---|
| 6,651,991 | B2 * | 11/2003 | Carlstedt | ............ | B60G 21/0556 |
| | | | | | 280/5.511 |
| 6,789,813 | B2 * | 9/2004 | Schmidt | ............... | B60G 21/055 |
| | | | | | 280/124.165 |

| | | | | | |
|---|---|---|---|---|---|
| 7,100,926 | B2 * | 9/2006 | Osterlanger | ....... | B60G 17/0162 |
| | | | | | 280/5.502 |
| 7,162,945 | B2 * | 1/2007 | Tatsuya | .............. | B60G 17/0162 |
| | | | | | 91/441 |
| 7,207,574 | B2 * | 4/2007 | Gradu | ................ | B60G 21/0558 |
| | | | | | 280/5.511 |
| 7,543,832 | B2 * | 6/2009 | Nelson | ............... | B60G 21/0551 |
| | | | | | 267/285 |
| 7,819,406 | B2 * | 10/2010 | Beetz | ................. | B60G 21/0555 |
| | | | | | 280/5.511 |
| 8,167,319 | B2 * | 5/2012 | Ogawa | .............. | B60G 21/0553 |
| | | | | | 280/5.511 |
| 8,690,174 | B2 * | 4/2014 | Grau | ................... | F16F 15/1245 |
| | | | | | 280/5.509 |
| 8,690,175 | B2 * | 4/2014 | Brown | .............. | B60G 21/0556 |
| | | | | | 280/5.509 |
| 9,878,589 | B2 * | 1/2018 | Park | ................... | B60G 21/0556 |
| 10,118,457 | B2 * | 11/2018 | Yang | ................... | B60G 21/055 |

(Continued)

FOREIGN PATENT DOCUMENTS

| | | | | | |
|---|---|---|---|---|---|
| JP | 2007091099 | A | * | 4/2007 | ......... B60G 21/0556 |
| JP | 2017124705 | A | * | 7/2017 | |

(Continued)

*Primary Examiner* — Laura Freedman

(74) *Attorney, Agent, or Firm* — Slater Matsil, LLP

(57) ABSTRACT

In an embodiment a stabilizer bar assembly includes a first stabilizer bar and a second stabilizer bar arranged symmetrically to each other, a connection shaft concentrically connecting the first stabilizer bar and the second stabilizer bar, a protruding spring protruding radially from the connection shaft, and a groove formed in the first stabilizer bar accommodating the protruding spring, wherein the protruding spring is configured to vary its torsional rigidity according to a rotational displacement between the protruding spring and the first stabilizer bar.

20 Claims, 11 Drawing Sheets

(56)                        References Cited

U.S. PATENT DOCUMENTS

| | | | | |
|---|---|---|---|---|
| 10,752,077 B2 * | 8/2020 | Park | .................. | F16D 11/14 |
| 10,940,736 B2 * | 3/2021 | Romelhardt | ....... | B60G 17/0152 |
| 10,987,990 B2 * | 4/2021 | Lim | .................. | B60G 21/0553 |
| 11,161,386 B2 * | 11/2021 | Dhanraj | ............... | B60G 21/073 |
| 11,285,777 B2 * | 3/2022 | Lim | .................. | B60G 21/106 |
| 11,685,222 B2 * | 6/2023 | Kim | .................. | B60G 17/0162 |
| | | | | 280/5.511 |
| 12,179,533 B1 * | 12/2024 | Kim | .................. | F16F 1/145 |
| 12,220,964 B2 * | 2/2025 | Lee | .................. | B60G 21/0556 |
| 12,344,058 B1 * | 7/2025 | Kim | .................. | B60G 11/23 |
| 2025/0319735 A1 * | 10/2025 | Kim | .................. | B60G 17/025 |

FOREIGN PATENT DOCUMENTS

| | | | | |
|---|---|---|---|---|
| KR | 20190051458 A | * | 5/2019 | ......... B60G 21/0551 |
| KR | 20240066811 A | | 5/2024 | |

* cited by examiner

STABILIZER BAR ASSEMBLY FOR VEHICLE

CROSS-REFERENCE TO RELATED APPLICATIONS

The present application claims priority to Korean Patent Application No. 10-2025-0061430, filed May 12, 2025, the entire contents of which is incorporated herein for all purposes by this reference.

TECHNICAL FIELD

The present disclosure relates to a stabilizer bar assembly for a vehicle.

BACKGROUND

A vehicle stabilizer elastically connects the left and right wheels of a vehicle to suppress body roll during cornering and other situations.

In most cases, the stabilizer is equipped in the form of a simple elastic bar and maintains a constant torsional rigidity against body roll. In some vehicles, such as luxury vehicles, the torsional rigidity is actively varied to improve a vehicle's ride quality by providing more optimized control in adapting to different driving conditions, but this requires the use of expensive actuators.

The description provided above as a related art of the present disclosure is just for helping understand the background of the present disclosure and should not be construed as being included in the related art known by those skilled in the art.

SUMMARY

Embodiments provide a stabilizer bar assembly for a vehicle, which can significantly improve the ride comfort and driving performance of a vehicle at a relatively low cost by allowing torsional rigidity to be varied with a simple and compact configuration.

Embodiments are not limited to the above ones, and other embodiments not mentioned will be clearly understood by those skilled in the art from the description below.

Embodiments provide a stabilizer bar assembly for a vehicle including a first stabilizer bar and a second stabilizer bar arranged symmetrically to each other; a connection shaft concentrically connecting the first stabilizer bar and the second stabilizer bar; a protruding spring provided to protrude radially from the connection shaft; and a movable groove formed in the first stabilizer bar to accommodate the protruding spring and to vary a torsional rigidity of the protruding spring according to a rotational displacement between the protruding spring and the first stabilizer bar.

The assembly may further include a first fixing member penetrating and connecting the connection shaft and the first stabilizer bar; a second fixing member penetrating and connecting the connection shaft and the second stabilizer bar; and a movable slot formed in a circumferential direction on the first stabilizer bar to allow relative rotation of the first fixing member.

The protruding spring may be formed such that a circumferential width thereof is gradually reduced as going radially outward from the connection shaft.

The protruding spring may protrude from the connection shaft in a direction perpendicular to a central axis of the connection shaft.

The protruding spring may include a stopper part protruding from a surface of the connection shaft; and a spring part protruding from the stopper part and formed with a narrower circumferential width than the stopper part.

The stopper part and the spring part of the protruding spring may each be formed symmetrically in a circumferential direction with respect to a protruding center line that perpendicularly intersects a central axis of the connection shaft.

The movable groove may have a circumferential width greater than a circumferential width of the stopper part of the protruding spring, and may be formed symmetrically in a circumferential direction with respect to a depressed center line that perpendicularly intersects a central axis of the first stabilizer bar.

The movable groove may be formed symmetrically in a circumferential direction with respect to a depressed center line that perpendicularly intersects a central axis of the first stabilizer bar, and may include an inclined part configured to slope radially inward toward opposite sides in the circumferential direction from a portion of the movable groove where the depressed center line passes.

The inclined part may be formed to be spaced apart from the stopper part of the protruding spring.

The movable groove may be formed symmetrically in a circumferential direction with respect to a depressed center line that perpendicularly intersects a central axis of the first stabilizer bar, and may have an exposure hole formed at a portion thereof where the depressed center line passes, through which the spring part of the protruding spring passes.

The spring part of the protruding spring may be inserted through the exposure hole to protrude onto a surface of the first stabilizer bar.

The protruding spring may be formed such that a circumferential width thereof continuously narrows as going radially outward from the connection shaft.

The protruding spring may be formed such that opposite ends thereof protruding radially outward from the connection shaft are linearly narrowed.

The protruding spring may be formed such that opposite ends thereof protruding radially outward from the connection shaft are narrowed in a curved manner.

The movable groove may have a circumferential width greater than a maximum circumferential width of the protruding spring, and may be formed symmetrically in a circumferential direction with respect to a depressed center line that perpendicularly intersects a central axis of the first stabilizer bar.

The movable groove may be formed symmetrically in a circumferential direction with respect to a depressed center line that perpendicularly intersects a central axis of the first stabilizer bar, and may have a circumferential width such that the movable groove does not come into contact with a root part of the protruding spring, where the circumferential width of the protruding spring is the greatest and which is adjacent to the connection shaft, even at the maximum allowable rotational displacement between the first stabilizer bar and the second stabilizer bar.

The movable groove may be formed symmetrically in a circumferential direction with respect to a depressed center line that perpendicularly intersects a central axis of the first stabilizer bar, and may include an inclined part configured to slope radially inward toward opposite sides in the circumferential direction from a portion of the movable groove where the depressed center line passes.

The movable groove may be formed symmetrically in a circumferential direction with respect to a depressed center line that perpendicularly intersects a central axis of the first stabilizer bar, and may have an exposure hole formed at a portion where the depressed center line passes, through which an end of the protruding spring passes.

The first stabilizer bar and the second stabilizer bar may be formed with symmetrical lengths on opposite sides centered on the protruding spring of the connection shaft.

The protruding spring may be provided in plural numbers along a circumferential direction of the connection shaft, and the movable groove may be provided in plural numbers along a circumferential direction at an end of the first stabilizer bar to correspond with the plurality of protruding springs.

According to the present disclosure, it is possible to significantly improve the ride comfort and driving performance of a vehicle at a relatively low cost by allowing torsional rigidity to be varied with a simple and compact configuration.

The effect of the present disclosure is not limited to the above-mentioned effects, and other effects not mentioned will be clearly understood by those skilled in the art from the description below.

BRIEF DESCRIPTION OF THE DRAWINGS

Figure 8:
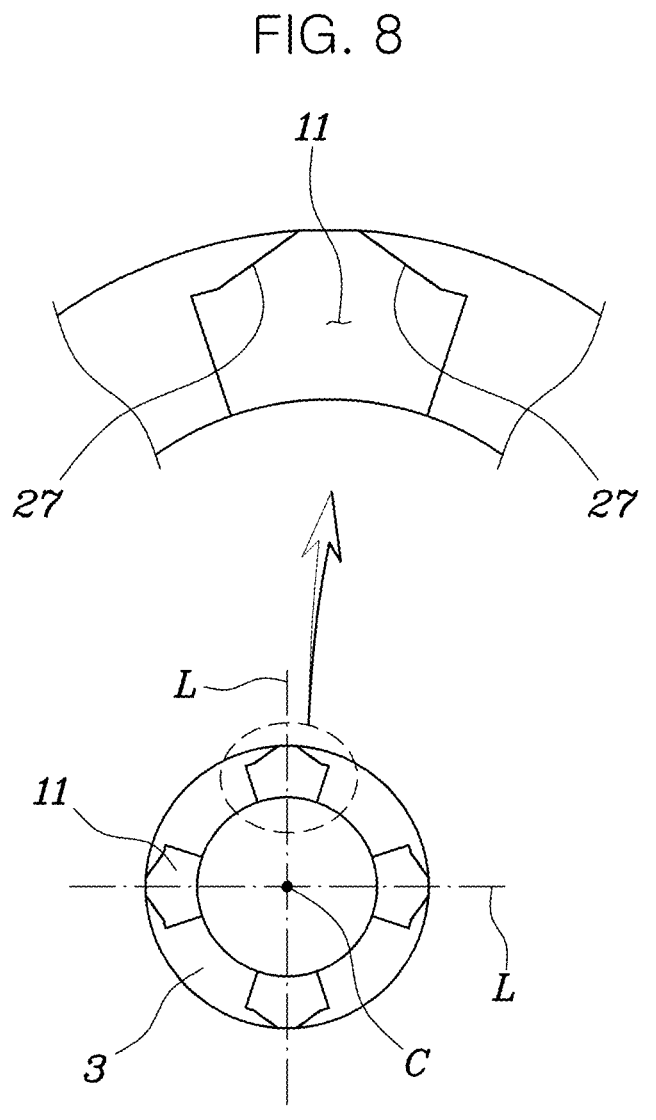

FIG. 8 is a view showing in detail a first stabilizer bar and a movable groove of FIG. 5.

FIG. 11 is a graph showing the change in torsional rigidity according to the relative rotational displacement between the first stabilizer bar and the second stabilizer bar, as in FIGS. 9 and 10.

FIG. 17 is a graph showing the change in torsional rigidity according to the relative rotational displacement between the first stabilizer bar and the second stabilizer bar, as in FIG. 16.

DETAILED DESCRIPTION OF ILLUSTRATIVE EMBODIMENTS

Figure 1:
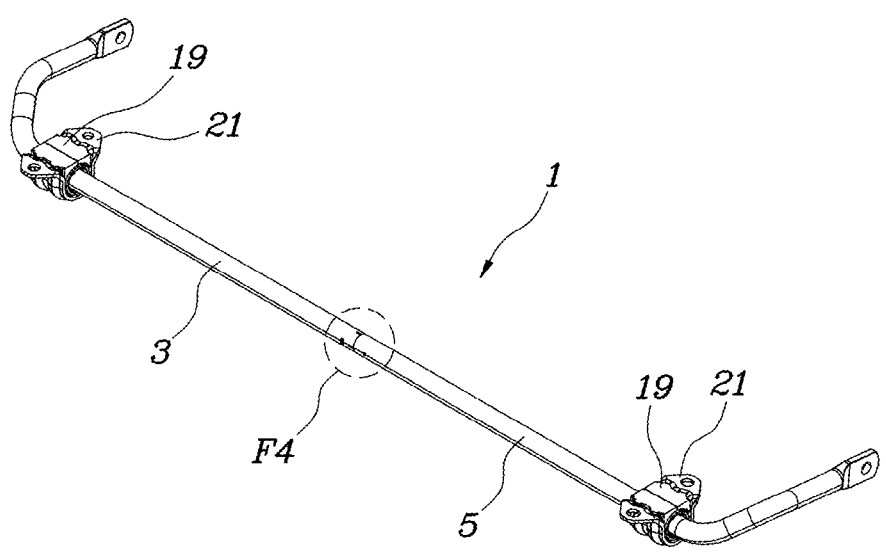
FIG. 1 is a view showing a stabilizer bar assembly for a vehicle according to the present disclosure.
Figure 2:
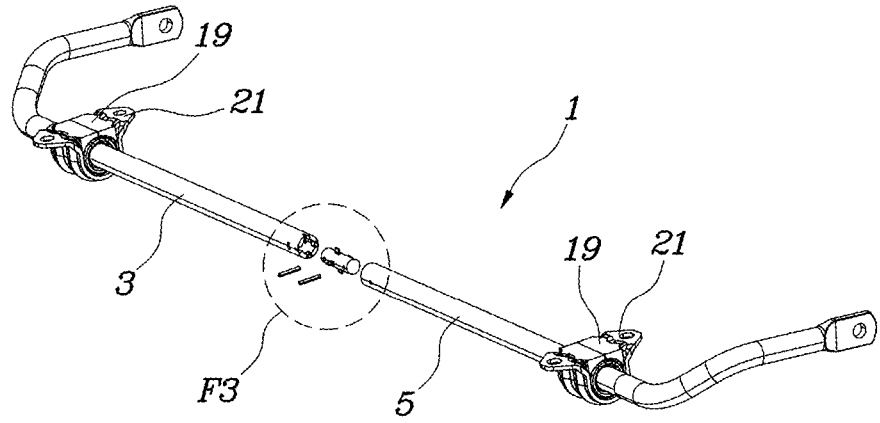
FIG. 2 is a view showing the main part of FIG. 1 in disassembly.
Figure 3:
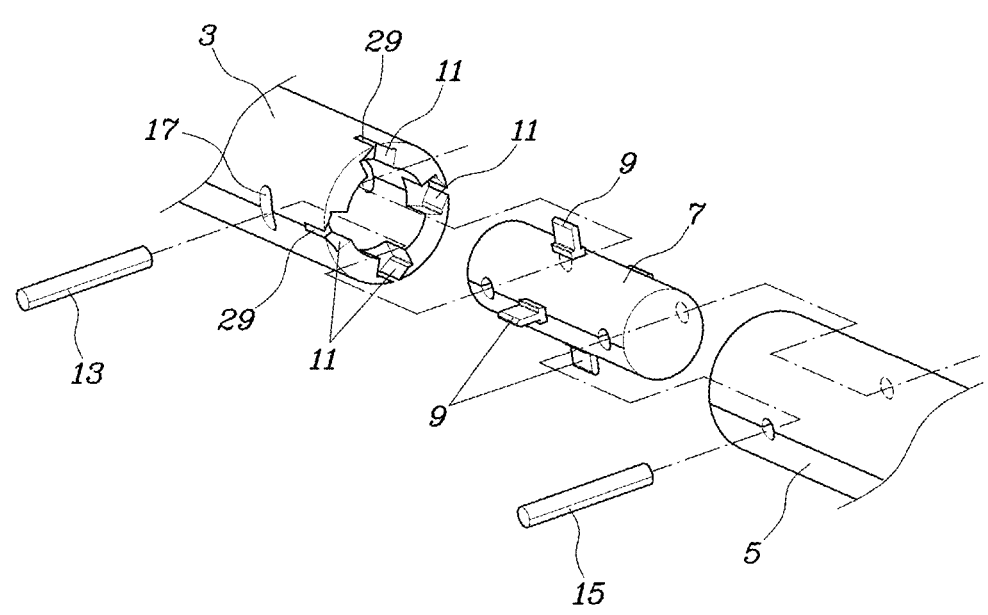
FIG. 3 is a detailed view of part F3 of FIG. 2.
Figure 4:
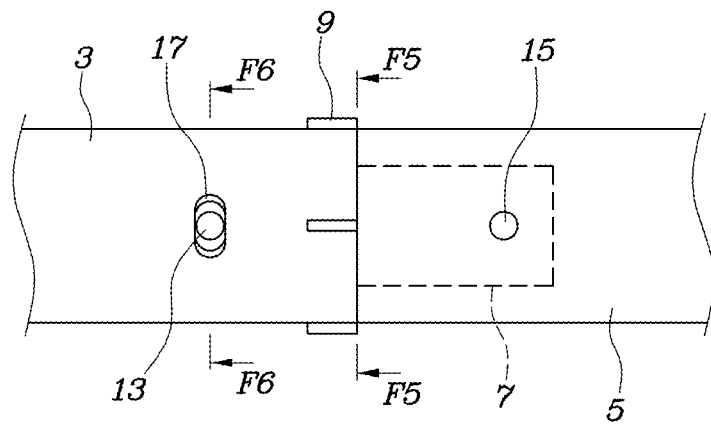
FIG. 4 is a detailed view of part F4 of FIG. 1.

In describing an exemplary embodiment disclosed in the present specification, the detailed description thereof will be omitted when it is determined that a detailed description of the related known technology may obscure the gist of the exemplary embodiment disclosed in the present specification. In addition, the accompanying drawings may be only intended to facilitate an easy understanding of the exemplary embodiment disclosed in the present specification, and the technical idea disclosed in the present specification may not be limited by the accompanying drawings, and should be understood to include all modifications, equivalents, or substitutes included in the spirit and technical scope of the present disclosure.

Terms including ordinal numbers such as "first", "second", etc. may be used to describe various components, but the components are not to be construed as being limited to the terms. The terms are used only to distinguish one component from another component.

Singular expressions may include plural expressions unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Terms "module" and "unit" that are used for components in the following description are used only for the convenience of description without having discriminate meanings or functions.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Any number or variety of components in any of the configurations described herein may be included within the disclosure described herein. The components may include any combination of the features described herein and may be arranged in any of the various configurations described herein. The concepts regarding the structure and arrangement of the components of the present disclosure, as well as their use and operation, may be applied not only to the specific embodiments discussed herein, but to any number of embodiments in any combination. Embodiments including those having various features in various arrangements are described below with reference to the drawings.

Hereinafter, various embodiments disclosed in the present disclosure will be described in detail with reference to the accompanying drawings, in which identical or similar elements are given the same reference numerals regardless of the reference numerals of the drawings, and repeated description thereof will be omitted.

Referring to FIGS. 1 to 16, a stabilizer bar assembly 1 for a vehicle according to an embodiment of the present disclosure may include: a first stabilizer bar 3 and a second stabilizer bar 5 arranged symmetrically to each other; a connection shaft 7 concentrically connecting the first stabilizer bar 3 and the second stabilizer bar 5; a protruding spring 9 provided to protrude radially from the connection shaft 7; a movable groove 11 formed in the first stabilizer bar 3 to accommodate the protruding spring 9 and to vary the torsional rigidity of the protruding spring 9 according to the rotational displacement between the protruding spring 9 and the first stabilizer bar 3; a first fixing member 13 penetrating and connecting the connection shaft 7 and the first stabilizer bar 3; a second fixing member 15 penetrating and connecting the connection shaft 7 and the second stabilizer bar 5; and a movable slot 17 formed in the circumferential direction on the first stabilizer bar 3 to allow relative rotation of the first fixing member 13.

That is, the stabilizer bar assembly 1 for a vehicle according to the present disclosure is configured such that the first stabilizer bar 3 and the second stabilizer bar 5 are connected to each other by the connection shaft 7.

For reference, FIG. 1 shows a mounting bush 19 and a mounting bracket 21 that surround the first stabilizer bar 3 and the second stabilizer bar 5 and support the first stabilizer bar 3 and the second stabilizer bar 5 to the vehicle body.

In this embodiment, the connection shaft 7 is connected with opposite ends inserted into the end of the first stabilizer bar 3 and the end of the second stabilizer bar 5, respectively. The connection shaft 7 is fixed to the first stabilizer bar 3 by the first fixing member 13 and fixed to the second stabilizer bar 5 by the second fixing member 15.

The first fixing member 13 is coupled to the first stabilizer bar 3 so as to be able to rotate, together with the connection shaft 7, relative to the first stabilizer bar 3 within the range permitted by the movable slot 17, so that the first fixing member 13 is restrained with respect to the connection shaft 7 and the first stabilizer bar 3 in the longitudinal direction of the connection shaft 7, but is capable of relative rotation, together with the connection shaft 7, with respect to the first stabilizer bar 3 in the circumferential direction of the connection shaft 7. Ultimately, the connection shaft 7 is restrained in the longitudinal direction thereof with respect to the first stabilizer bar 3, but is allowed to rotate within a certain range in the circumferential direction thereof with respect to the first stabilizer bar 3.

Meanwhile, the second fixing member 15 is configured to be inserted into a simple hole formed in each of the second stabilizer bar 5 and the connection shaft 7. By the second fixing member 15, the connection shaft 7 is restrained in both the longitudinal direction and circumferential direction thereof with respect to the second stabilizer bar 5, so that the connection shaft 7 practically moves as one unit with the second stabilizer bar 5.

In this case, the first fixing member 13 and the second fixing member 15 may be configured as simple pins as shown and fixed to the connection shaft 7 by press-fitting or heat shrinkage, and may also be configured as bolts or rivets, etc.

In the embodiment shown in FIGS. 2 to 11, the protruding spring 9 is formed so that the circumferential width thereof gradually narrows as going radially outward from the connection shaft 7.

That is, the protruding spring 9 may include: a stopper part 23 protruding from the surface of the connection shaft 7; and a spring part 25 protruding from the stopper part 23 and formed with a narrower circumferential width than the stopper part 23.

The protruding spring 9 protrudes from the connection shaft 7 in a direction that perpendicularly intersects a central axis C of the connection shaft 7, and the stopper part 23 and spring part 25 of the protruding spring 9 are formed to be symmetrical in the circumferential direction with respect to a protruding center line R.

In response to this, the movable groove 11 has a circumferential width wider than the circumferential width of the stopper part 23 of the protruding spring 9, and is formed symmetrically in the circumferential direction with respect to a depressed center line L that perpendicularly intersects the central axis C of the first stabilizer bar 3.

In addition, the movable groove 11 includes an inclined part 27 formed symmetrically in the circumferential direction with respect to the depressed center line L and configured to slope radially inward toward opposite sides in the circumferential direction from a portion of the movable groove 11 where the depressed center line L passes. The inclined part 27 is formed to be spaced apart from the stopper part 23 of the protruding spring 9.

Figure 9:
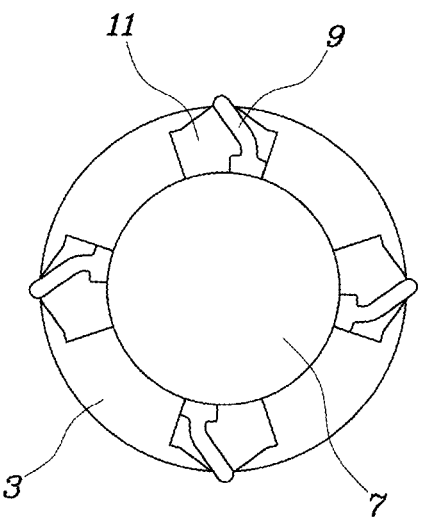
FIGS. 9 and 10 are views each showing a situation in which relative rotation occurs between a first stabilizer bar and a second stabilizer bar in the configuration of FIG. 5.
Figure 10:
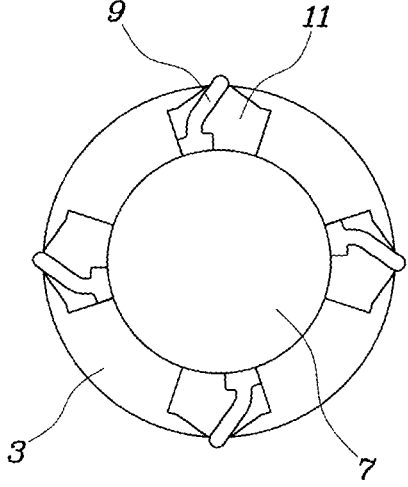
Figure 11:
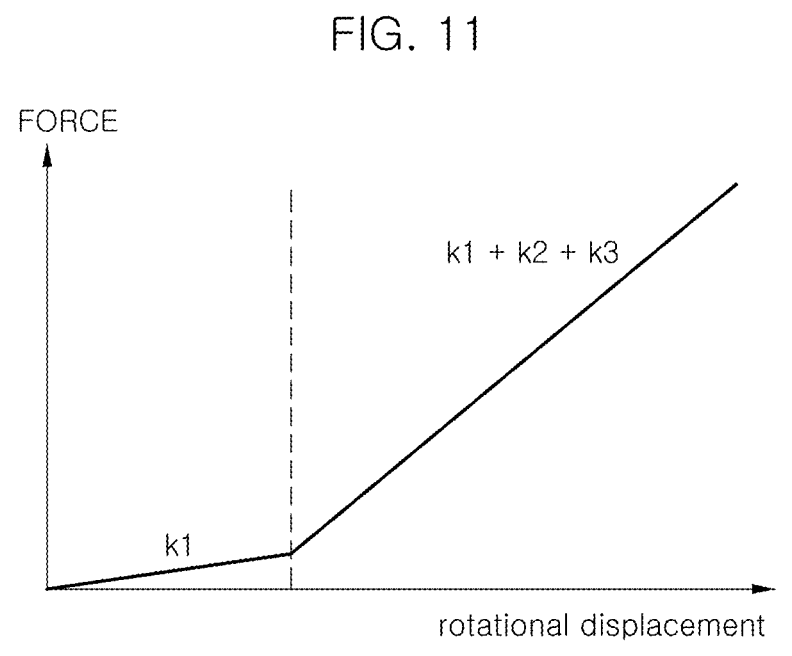

Thus, when a situation occurs where relative rotation occurs between the first stabilizer bar 3 and the second stabilizer bar 5 due to body roll, etc., the spring part 25 of the protruding spring 9 is deformed to a state as shown in FIG. 9 or FIG. 10, and the torsional rigidity exerted by the stabilizer bar assembly 1 changes from a relatively small value of K1 to a state of K1+K2+K3 as shown in FIG. 11.

The section where the torsional rigidity is K1 means a section where only the spring part 25 of the protruding spring 9 is deformed due to the relative rotation of the first stabilizer bar 3 and the second stabilizer bar 5, whereas the section where the torsional rigidity is K1+K2+K3 means a section after the point where the stopper part 23 comes into contact with the movable groove 11, in addition to the deformation of the spring part 25 of the protruding spring 9.

In this case, K1 refers to the torsional rigidity determined by the spring part 25 of the protruding spring 9, K2 refers to the torsional rigidity of the first stabilizer bar 3 itself, and K3 refers to the torsional rigidity of the second stabilizer bar 5 itself.

That is, due to body roll, etc., when the relative rotational displacement between the first stabilizer bar 3 and the second stabilizer bar 5 gradually increases, initially only the spring part 25 of the protruding spring 9 is deformed, and the torsional rigidity of the stabilizer bar assembly 1 becomes K1, but when the relative rotational displacement increases further and the stopper part 23 begins to contact with the movable groove 11, not only the spring part 25 but also the first stabilizer bar 3 and the second stabilizer bar 5 themselves are deformed together, so that the torsional rigidity of the stabilizer bar assembly 1 becomes K1+K2+K3.

Thus, the stabilizer bar assembly 1 of the present disclosure may improve the ride comfort and reduce road noise by exerting relatively small torsional rigidity in a range where the vertical displacement between the left and right wheels of a vehicle is relatively small, and may effectively suppress body roll by exerting relatively large torsional rigidity in a range where the vertical displacement between the left and right wheels is relatively large, thereby improving the driving stability of a vehicle.

The stabilizer bar assembly 1 of the present disclosure has a great technical effect of reducing the cost required by enabling the above-mentioned functions to be implemented by the own structural characteristics thereof without using a separate sensor or actuator.

For reference, the reason why the inclined part 27 is formed to be spaced apart from the stopper part 23 is to ensure that, as described above, the change in the torsional rigidity of the stabilizer bar assembly is precisely distinguished by the contact between the stopper part 23 and the movable groove 11, and to prevent the stopper part 23 from being caught in the inclined part 27.

Figure 5:
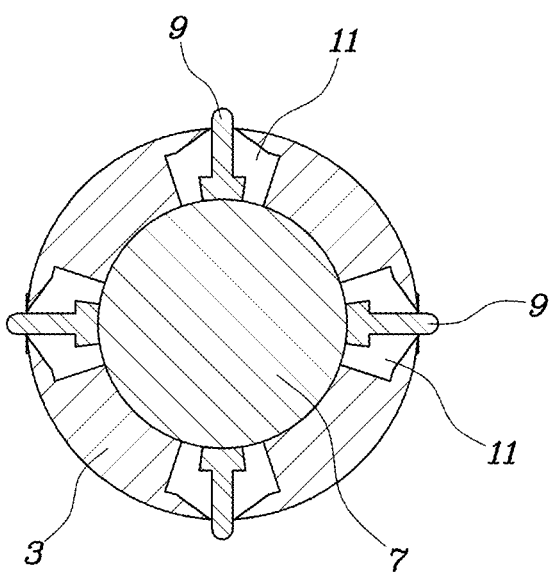
FIG. 5 is a cross-sectional view taken along line F5-F5 of FIG. 4.
Figure 6:
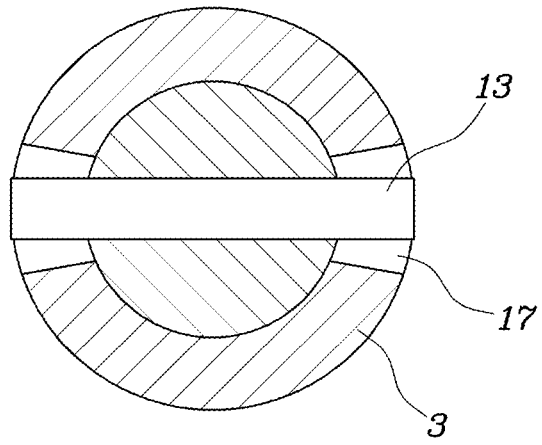
FIG. 6 is a cross-sectional view taken along line F6-F6 of FIG. 4.
Figure 7:
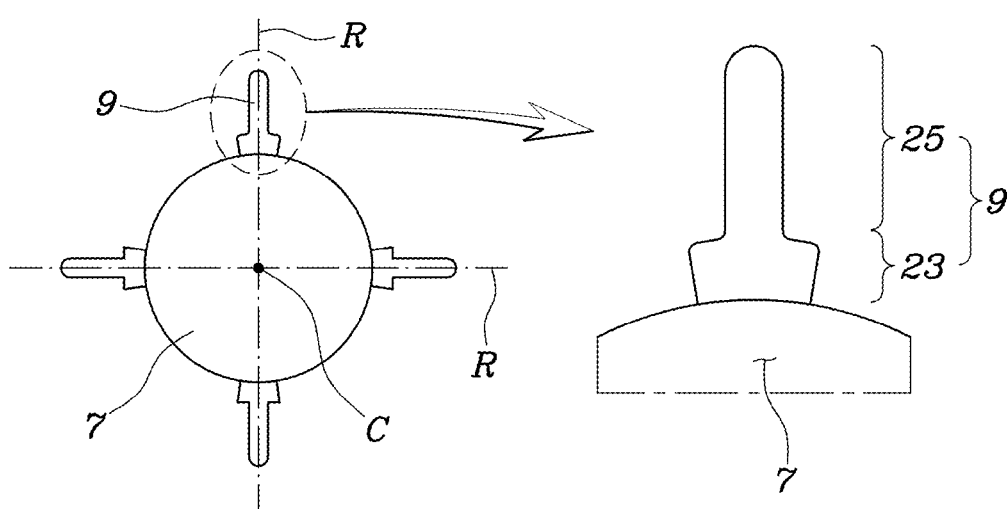
FIG. 7 is a view showing in detail a connection shaft and a protruding spring of FIG. 5.

Meanwhile, when the torsional external force applied to the first stabilizer bar 3 and the second stabilizer bar 5 is removed, the spring part 25 of the protruding spring 9 returns to the state as shown in FIG. 5 due to elastic force, and in such a situation, the inclined part 27 of the movable groove 11 serves to guide the spring part 25 to easily return to the depressed center line L of the movable groove 11.

The movable groove 11 may have an exposure hole 29 formed at the portion thereof where the depressed center line L passes, through which the spring part 25 of the protruding spring 9 passes through.

When the exposure hole 29 is formed in the movable groove 11 of the first stabilizer bar 3 as above and the spring part 25 of the connection shaft 7 is installed by penetrating the exposure hole 29, the tip of the spring part 25 is substantially fixed in position in the exposure hole 29. As a result, when the deformed spring part 25 is restored to the state as shown in FIG. 5 as the torsional external force applied to the first stabilizer bar 3 and the second stabilizer bar 5 is removed, the restoration of the spring part 25 may be made more easily and reliably.

For reference, the movable groove 11 and the exposure hole 29 are formed at the end of the first stabilizer bar 3 so that the protruding spring 9 of the connection shaft 7 may be easily assembled.

Figure 12:
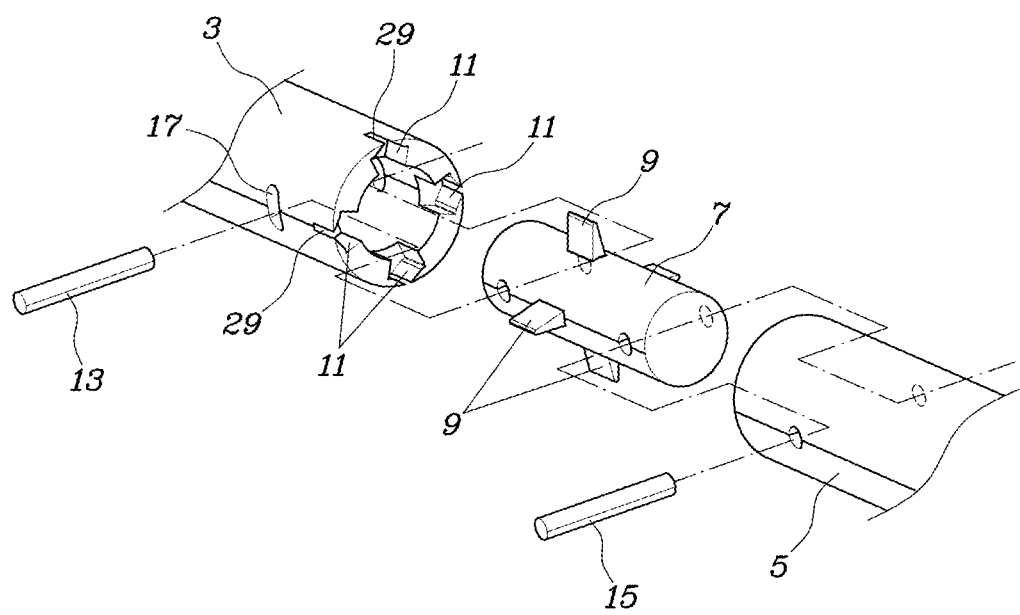
FIG. 12 is a view showing another embodiment of the protruding spring and the movable groove.

Meanwhile, FIG. 12 shows another embodiment of the protruding spring 9 and the movable groove 11, wherein the protruding spring 9 is formed so that the circumferential width thereof continuously narrows as going radially outward from the connection shaft 7.

Figure 14:
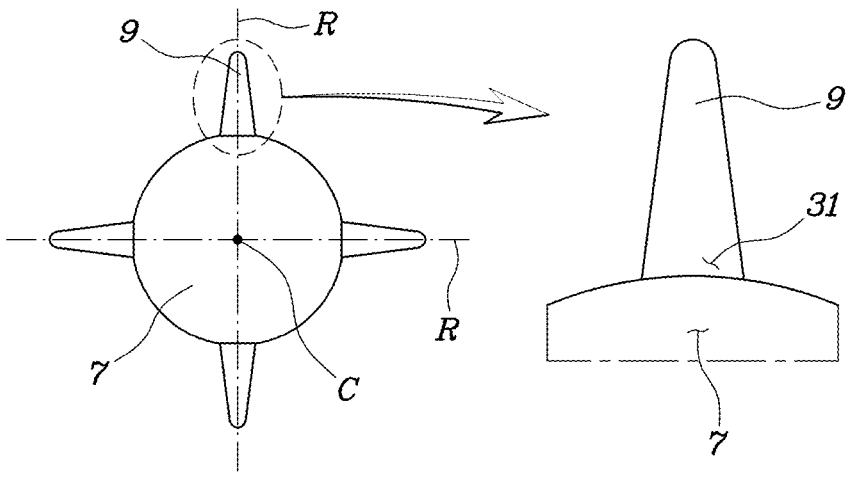
FIG. 14 is a view showing in detail the connection shaft and the protruding spring of FIG. 13.

For example, as shown in FIG. 14, the protruding spring 9 may be formed so that opposite ends thereof protruding radially outward from the connection shaft 7 are linearly narrowed.

Figure 15:
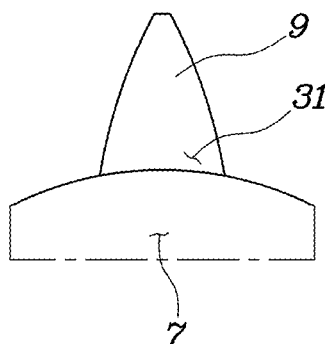
FIG. 15 is a view showing another example of the protruding spring formed in the connection shaft.

In addition, as shown in FIG. 15, the protruding spring 9 may be formed so that opposite ends thereof protruding radially outward from the connection shaft 7 are narrowed in a curved manner.

In FIG. 15, the protruding spring 9 is formed so that the circumferential width of a root part 31 connected to the connection shaft 7 is larger than that of the example in FIG. 14, and opposite ends thereof are formed in a curved convex shape, thereby providing a bigger spring rigidity than that of the example in FIG. 14.

The movable groove 11 has a circumferential width greater than the maximum circumferential width of the protruding spring 9 and is formed symmetrically in the circumferential direction with respect to the depressed center line L that perpendicularly intersects the central axis C of the first stabilizer bar 3.

That is, since the circumferential width of the protruding spring 9 is continuously reduced as going radially outward from the connection shaft 7, the maximum circumferential width of the protruding spring 9 is formed at the root part 31 of the protruding spring 9 where the protruding spring 9 meets the connection shaft 7, and accordingly, the movable groove 11 is formed to have a circumferential width wider than the circumferential width of the root part 31 of the protruding spring 9.

In particular, the movable groove 11 may be formed with a circumferential width that does not allow the movable groove 11 to come into contact with the root part 31, where the circumferential width of the protruding spring 9 is the greatest and which is adjacent to the connection shaft 7, even at the maximum allowable rotational displacement between the first stabilizer bar 3 and the second stabilizer bar 5.

In this case, the maximum allowable rotational displacement between the first stabilizer bar 3 and the second stabilizer bar 5 may be the rotational displacement according to the maximum allowable displacement of the left and right wheels in the up and down direction when designing a vehicle, and the fact that the movable groove 11 is formed so that the root part 31 of the protruding spring 9 does not come into contact with the movable groove 11 even in this situation (even at the maximum allowable rotational displacement between the first stabilizer bar 3 and the second stabilizer bar 5) means that the root part 31 of the protruding spring 9 is configured so as not to contact with the movable groove 11 within the actual operating range.

Figure 16:
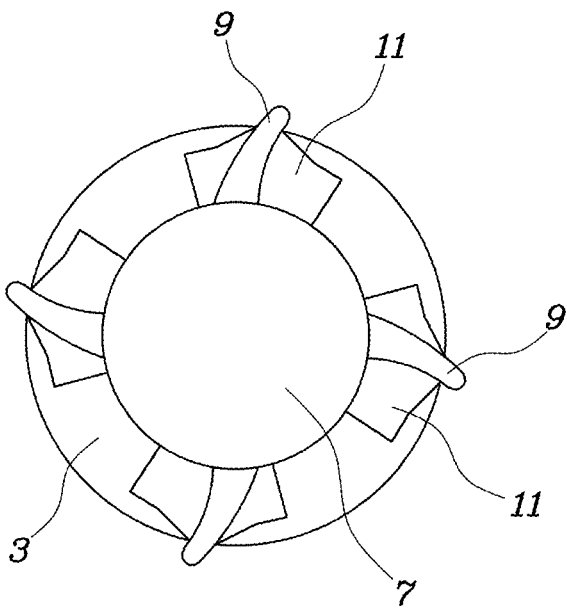
FIG. 16 is a view showing a situation in which relative rotation occurs between the first stabilizer bar and the second stabilizer bar in the configuration of FIG. 13.
Figure 17:
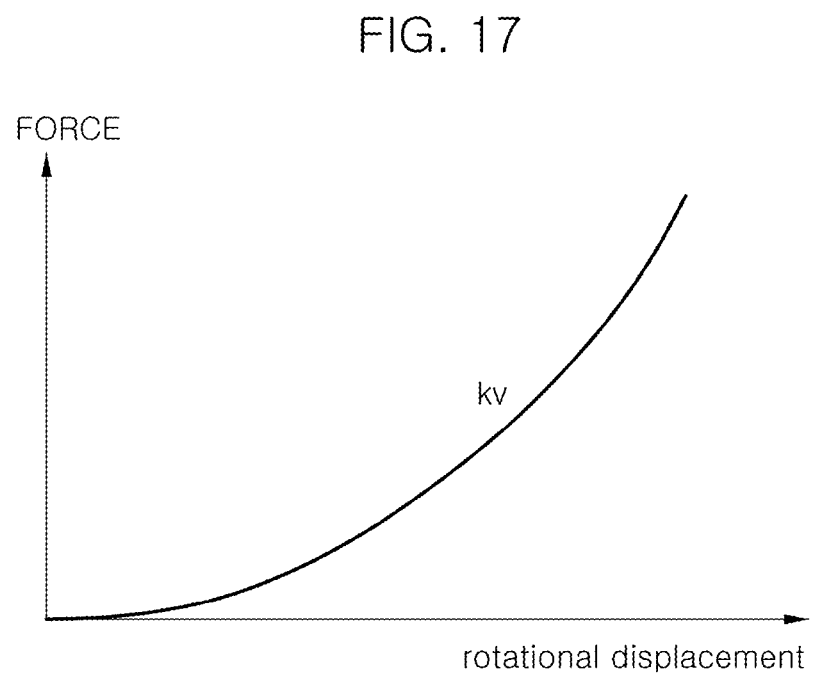

With this configuration, when a situation occurs where relative rotation occurs between the first stabilizer bar 3 and the second stabilizer bar 5 due to body roll, etc., as the protruding spring 9 is deformed to a state as shown in FIG. 16, the torsional rigidity exerted by the stabilizer bar assembly 1 may exhibit characteristics such as KV that gradually increases continuously as exemplified in FIG. 17.

That is, in this embodiment, unlike FIG. 11, the torsional rigidity of the stabilizer bar assembly 1 exhibits a characteristic of continuously and gradually increasing without an inflection point with respect to rotational displacement.

This is to enhance ride comfort while reducing road noise by forming the torsional rigidity of the stabilizer bar assembly 1 as low as possible in situations such as straight-line driving of a vehicle, and to increase the torsional rigidity of the stabilizer bar assembly 1 correspondingly according to the increase in roll displacement due to the increase in turning acceleration, thereby significantly improving the driving stability of the vehicle through more effective body roll suppression.

The present embodiment also has a great technical effect of reducing the cost required by enabling the implementation of the above-mentioned functions with a relatively simple configuration without using a separate sensor or actuator.

Meanwhile, in the present embodiment as well, the movable groove 11 is formed symmetrically in the circumferential direction with respect to the depressed center line L that perpendicularly intersects the central axis C of the first stabilizer bar 3, and includes the inclined part 27 that slopes radially inward toward opposite sides in the circumferential direction from a portion of the movable groove 11 where the depressed center line L passes, so that when the protruding spring 9 returns toward the depressed center line L, the inclined part 27 guides the protruding spring 9 to enable easy return.

Figure 13:
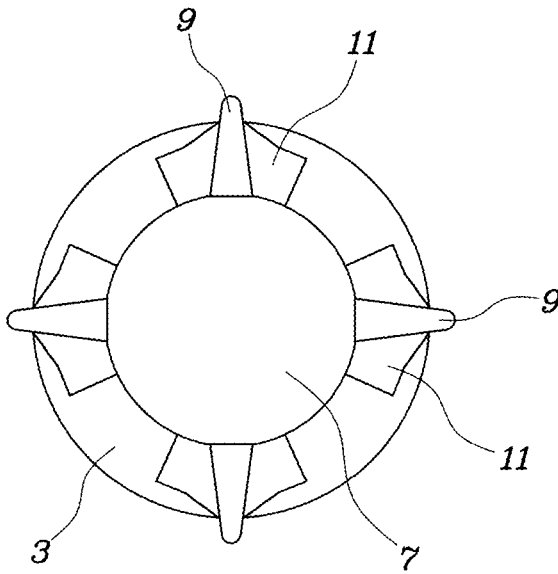
FIG. 13 is a view showing a state in which the connection shaft and the protruding spring of FIG. 12 are connected to the first stabilizer bar.

In addition, the movable groove 11 has the exposure hole 29 formed at the portion thereof where the depressed center line L passes, through which the end of the protruding spring 9 passes, so that the position of the end of the protruding spring 9 inserted into the exposure hole 29 is substantially fixed. As a result, when the torsional external force applied to the first stabilizer bar 3 and the second stabilizer bar 5 is removed, the protruding spring 9 may more easily and reliably return to the neutral state as shown in FIG. 13.

To make the above effect more certain, the spring part 25 of the protruding spring 9 may be inserted through the exposure hole 29 to protrude onto the surface of the first stabilizer bar 3.

Meanwhile, the first stabilizer bar 3 and the second stabilizer bar 5 may be formed with symmetrical lengths on opposite sides centered on the protruding spring 9 of the connection shaft 7.

Due to this, the characteristics of the change in torsional rigidity caused by the protruding spring 9 and the movable groove 11 are equally applied to the rotational displacement of the first stabilizer bar 3 or the second stabilizer bar 5, so that ultimately the same level of suspension characteristics may be implemented for the up-and-down movement of the left and right wheels.

A plurality of protruding springs 9 may be provided along the circumferential direction of the connection shaft 7, and a plurality of movable grooves 11 may be provided along the circumferential direction at the end of the first stabilizer bar 3 to correspond with the protruding springs 9.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A stabilizer bar assembly comprising:
a first stabilizer bar and a second stabilizer bar arranged symmetrically to each other;
a connection shaft concentrically connecting the first stabilizer bar and the second stabilizer bar;
a protruding spring protruding radially from the connection shaft; and
a groove formed in the first stabilizer bar accommodating the protruding spring,
wherein the protruding spring is configured to vary its torsional rigidity according to a rotational displacement between the protruding spring and the first stabilizer bar.

2. The stabilizer bar assembly of claim 1, further comprising:
a first fixing member penetrating and connecting the connection shaft and the first stabilizer bar;
a second fixing member penetrating and connecting the connection shaft and the second stabilizer bar; and
a slot formed in a circumferential direction on the first stabilizer bar to allow relative rotation of the first fixing member.

3. The stabilizer bar assembly of claim 1, wherein the protruding spring comprises a circumferential width gradually reducing when moving radially outward from the connection shaft.

4. The stabilizer bar assembly of claim 1, wherein the protruding spring protrudes from the connection shaft in a direction perpendicular to a central axis of the connection shaft.

5. The stabilizer bar assembly of claim 1, wherein the protruding spring comprises:
a stopper part protruding from a surface of the connection shaft; and
a spring part protruding from the stopper part, the spring part having a narrower circumferential width than the stopper part.

6. The stabilizer bar assembly of claim 5, wherein each of the stopper part and the spring part of the protruding spring is formed symmetrically in a circumferential direction with respect to a protruding center line that perpendicularly intersects a central axis of the connection shaft.

7. The stabilizer bar assembly of claim 5, wherein the groove has a circumferential width greater than a circumferential width of the stopper part of the protruding spring, and is formed symmetrically in a circumferential direction with respect to a depressed center line that perpendicularly intersects a central axis of the first stabilizer bar.

8. The stabilizer bar assembly of claim 5, wherein the groove is formed symmetrically in a circumferential direction with respect to a depressed center line that perpendicularly intersects a central axis of the first stabilizer bar, and includes an inclined part sloping radially inward toward opposite sides in the circumferential direction from a portion of the groove where the depressed center line passes.

9. The stabilizer bar assembly of claim 8, wherein the inclined part is spaced apart from the stopper part of the protruding spring.

10. The stabilizer bar assembly of claim 5, wherein the groove is formed symmetrically in a circumferential direction with respect to a depressed center line that perpendicularly intersects a central axis of the first stabilizer bar, and has an exposure hole formed at a portion where the depressed center line passes, through which the spring part of the protruding spring passes.

11. The stabilizer bar assembly of claim 10, wherein the spring part of the protruding spring is inserted through the exposure hole to protrude onto a surface of the first stabilizer bar.

12. The stabilizer bar assembly of claim 1, wherein the protruding spring comprises a circumferential width continuously narrowing when moving radially outward from the connection shaft.

13. The stabilizer bar assembly of claim 12, wherein the protruding spring comprises opposite ends that protrude radially outward from the connection shaft and are linearly narrowing.

14. The stabilizer bar assembly of claim 12, wherein the protruding spring comprises opposite ends that protrude radially outward from the connection shaft and are narrowing in a curved manner.

15. The stabilizer bar assembly of claim 12, wherein the groove has a circumferential width greater than a maximum circumferential width of the protruding spring, and wherein the groove is formed symmetrically in a circumferential direction with respect to a depressed center line that perpendicularly intersects a central axis of the first stabilizer bar.

16. The stabilizer bar assembly of claim 12, wherein the groove is formed symmetrically in a circumferential direction with respect to a depressed center line that perpendicularly intersects a central axis of the first stabilizer bar, and wherein the groove has a circumferential width such that the groove does not come into contact with a root part of the protruding spring, where the circumferential width of the protruding spring is greatest adjacent to the connection shaft, even at a maximum allowable rotational displacement between the first stabilizer bar and the second stabilizer bar.

17. The stabilizer bar assembly of claim 12, wherein the groove is formed symmetrically in a circumferential direction with respect to a depressed center line that perpendicularly intersects a central axis of the first stabilizer bar, and wherein the groove includes an inclined part sloping radially inward toward opposite sides in the circumferential direction from a portion of the groove where the depressed center line passes.

18. The stabilizer bar assembly of claim 12, wherein the groove is formed symmetrically in a circumferential direction with respect to a depressed center line that perpendicularly intersects a central axis of the first stabilizer bar, and wherein the groove has an exposure hole through which an end of the protruding spring passes and formed at a portion where the depressed center line passes.

19. The stabilizer bar assembly of claim 1, wherein the first stabilizer bar and the second stabilizer bar have symmetrical lengths on opposite sides centered on the protruding spring of the connection shaft.

20. The stabilizer bar assembly of claim 1,
wherein the protruding spring comprises a plurality of protruding springs along a circumferential direction of the connection shaft, and wherein the groove comprises a plurality of grooves along a circumferential direction at an end of the first stabilizer bar to correspond with the plurality of protruding springs.

\* \* \* \* \*